US006991093B2

(12) United States Patent
Tschantz

(10) Patent No.: US 6,991,093 B2
(45) Date of Patent: Jan. 31, 2006

(54) FOLD-OVER CONVEYOR BELT

(75) Inventor: Richard W. Tschantz, Louisville, OH (US)

(73) Assignee: Imperial Technologies, Inc., North Canton, OH (US)

( * ) Notice: Subject to any disclaimer, the term of this patent is extended or adjusted under 35 U.S.C. 154(b) by 0 days.

(21) Appl. No.: 10/656,458

(22) Filed: Sep. 5, 2003

(65) Prior Publication Data

US 2004/0134759 A1 Jul. 15, 2004

Related U.S. Application Data

(60) Provisional application No. 60/408,790, filed on Sep. 6, 2002.

(51) Int. Cl.
*B65G 15/08* (2006.01)

(52) U.S. Cl. ....................................... 198/819; 198/818

(58) Field of Classification Search ................. 198/819, 198/818
See application file for complete search history.

(56) References Cited

U.S. PATENT DOCUMENTS

| | | | | | |
|---|---|---|---|---|---|
| 2,303,762 A | * | 12/1942 | La Rue et al. | ........... | 198/690.2 |
| 2,998,121 A | * | 8/1961 | Gilbert | ....................... | 198/847 |
| 3,615,152 A | * | 10/1971 | Bouzat et al. | ............. | 198/847 |
| 3,630,340 A | * | 12/1971 | Bouzat et al. | ............. | 198/847 |
| 4,709,806 A | * | 12/1987 | Candle | ....................... | 198/819 |
| 4,760,913 A | * | 8/1988 | Tschantz | ..................... | 198/819 |
| 5,031,753 A | * | 7/1991 | Tschantz | ..................... | 198/819 |
| 5,107,983 A | * | 4/1992 | Tschantz | ..................... | 198/819 |
| 6,540,069 B2 | * | 4/2003 | Tschantz | .................. | 198/844.1 |

* cited by examiner

*Primary Examiner*—Joe Dillon, Jr.
(74) *Attorney, Agent, or Firm*—Sand & Sebolt

(57) ABSTRACT

This invention relates to an endless fold-over type of conveyor belt for use in conveying relatively-loose bulk material in an enclosed manner to prevent spillage, dusting and contamination of the material and allows the belt to operate at steep angles. The belt comprises essentially a rectangular uniform cross-sectional shape having a substantially greater width than thickness. Two similar arrays of longitudinal grooves are located on the side of the belt opposite to that carrying the load, the grooves being spaced on both sides of the belt medial portion to provide a pair of hinged areas for folding and unfolding the belt. The longitudinal grooves preferably are V-shaped or U-shaped and between one and five grooves may be provided in each array at about one-quarter the belt width from its edges to provide a pair of overlapping edge flaps to cover the medial area when in folded relation.

20 Claims, 5 Drawing Sheets

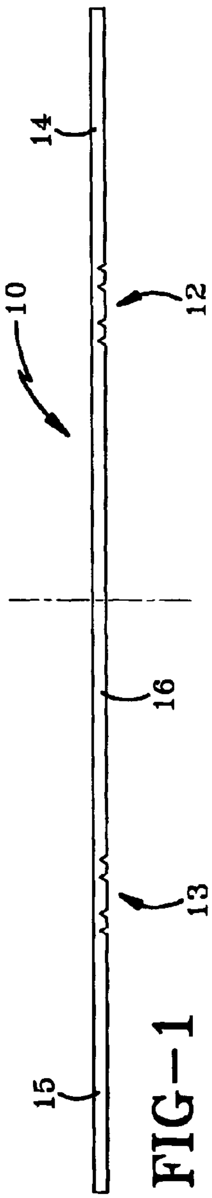
FIG—1
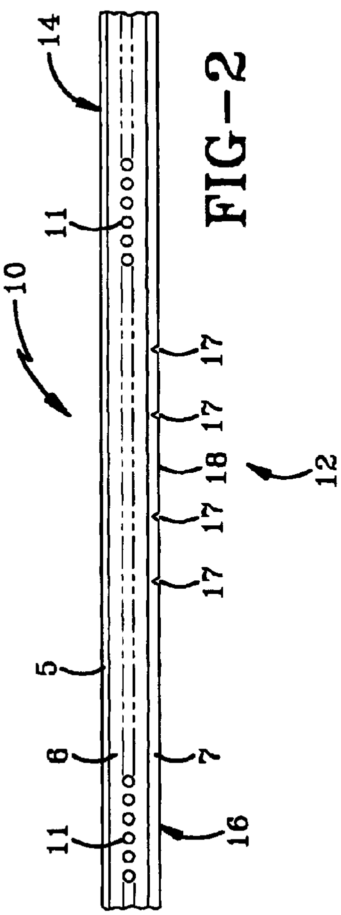
FIG—2
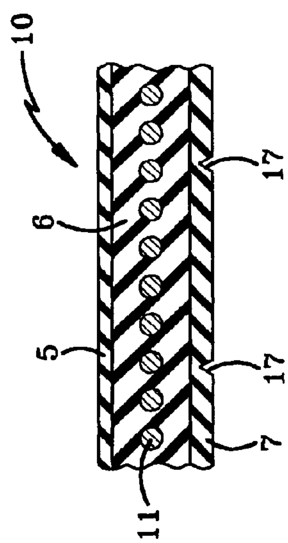
FIG—2A

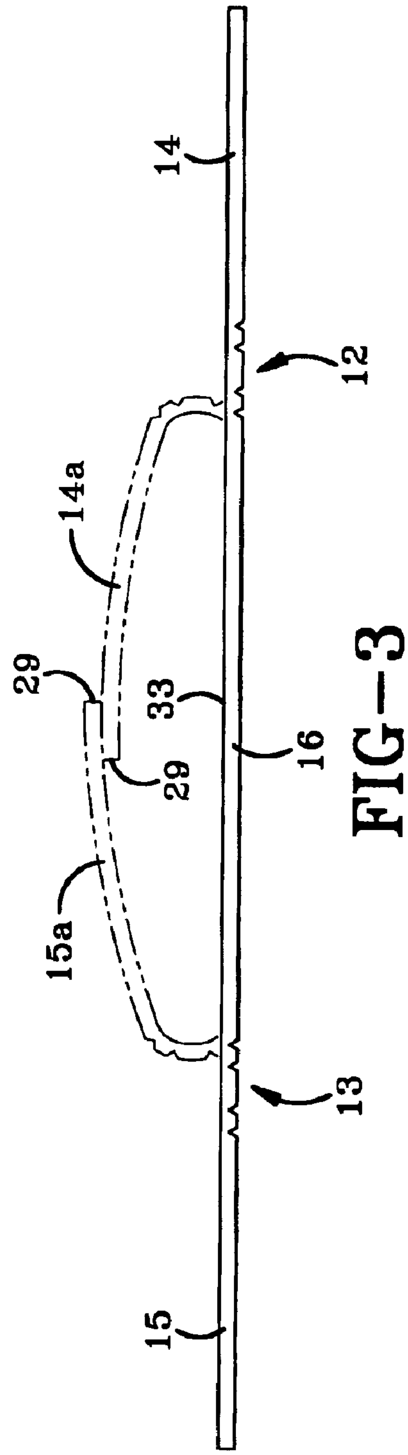
FIG—3
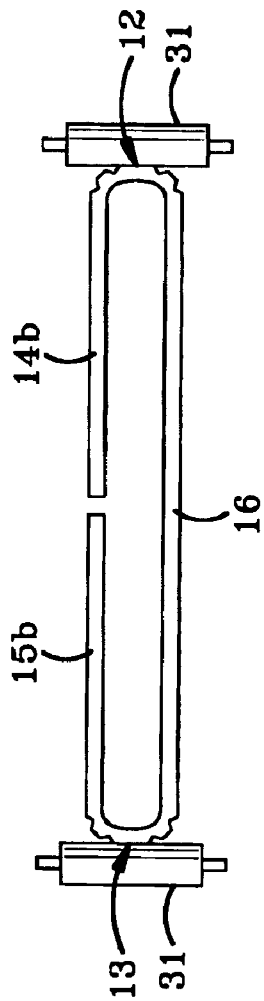
FIG—4

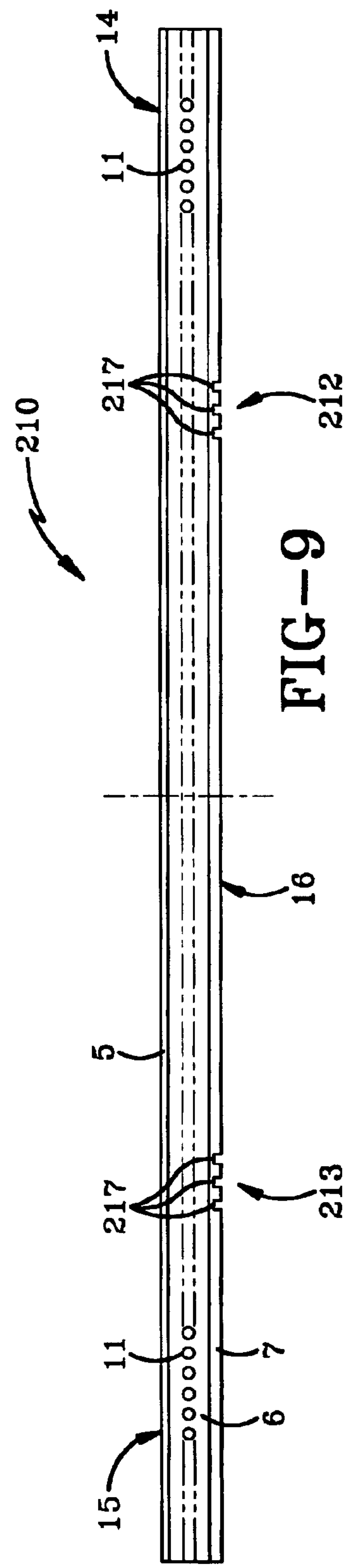
FIG—9
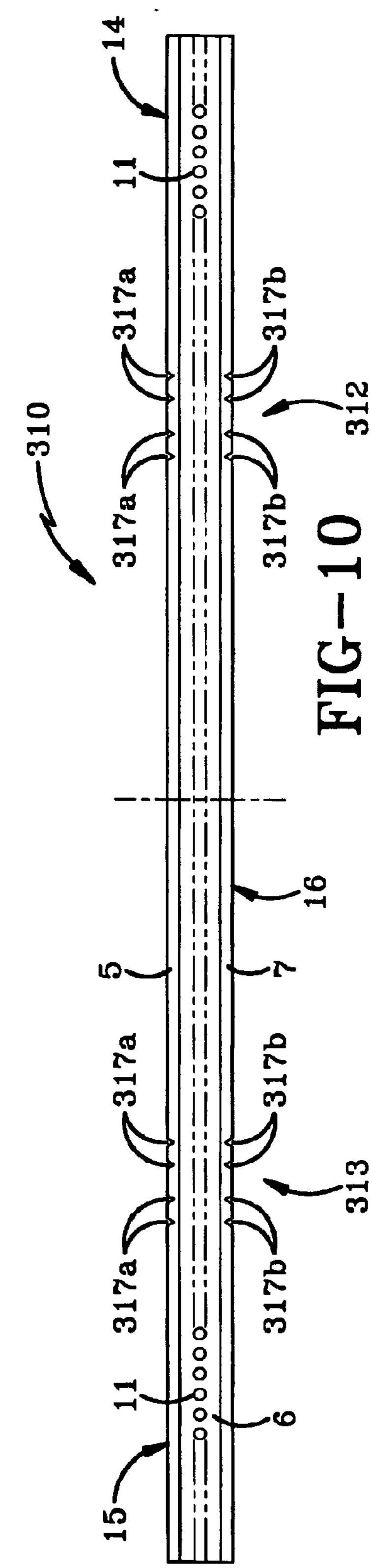
FIG—10

FOLD-OVER CONVEYOR BELT

RELATED APPLICATIONS

This application claims priority from U.S. Provisional Application Ser. No. 60/408,790 filed on Sep. 6, 2002.

BACKGROUND OF THE INVENTION

1. Technical Field

This invention generally relates to a flexible endless conveyor belt having a fold-over capability for conveying relatively-loose bulk material from one point to another especially along steep inclines and declines, the belt cover-flaps completely enclosing the load while it is conveyed.

2. Background Information

The subject invention which relates to an endless folding belt adapted for use in belt conveyor systems provides a significant improvement in such systems wherein the belt has a substantially longer service life at its hinged areas.

The belt is adapted for use in conveyor systems to move the folding belt by drive rolls while supported in intermediate areas on idler rolls, the belt having a pair of continuous flexible longitudinal cover or hinge flaps which permit the flaps to be folded and unfolded to facilitate loading and unloading of the belt at several load handling stations or positions. The folding belt is normally folded to enclose bulk materials during their transport from one position to another to eliminate spillage of the load or its contamination during transport and to permit the load to move along steep inclines and declines. The folding belt is capable of carrying significantly greater loads without producing dust-emitting conditions in the vicinity of the belt, the belt having an improved construction in its hinged areas for much longer-service life.

Prior forms of such folding belts have heretofore utilized single and multiple grooves at their hinged areas on the load-carrying side of the belt. This places a much larger bending moment on the belt in obtaining a hinged effect wherein the belt is essentially folded on itself at the pair of similarly grooved areas. Where the belt is formed from flexible elastomeric material, the interior grooves are compressed in a severe deleterious manner which shortens belt life where the belts are employed to carry significantly greater volumes of bulk material between loading and unloading positions. Belts having such single grooves at the hinged areas on the load-carrying side of the belts are disclosed in U.S. Pat. No. 4,709,806, along with known types of conveyor systems for transport of loose materials in an enclosed manner. While the interiorly grooved hinged areas have been used previously, the amount of undue stress placed on the belt at the hinged areas causes excessive wear and material carried on the belt is often caught in the grooves, prematurely wearing the belt and reducing belt life.

Prior to the advent of fold-over belts, open belts have been used previously in the art to convey bulk materials in a manner open to the atmosphere. In view of inherent dusting problems, the industry has utilized metal shrouding or other forms of enclosure of the belt to eliminate contamination dusting and to maintain the conveyed material in an essentially clean and uncontaminated condition. The use of shrouding occasionally results in accumulation of dust and in some cases a creation of explosive mixtures which occurrences are particularly dangerous and to be avoided. Prior to the use of folding-belt conveyor systems, such systems were objectionable in allowing spillage of the conveyed material frequently due to belt construction and its mounting for continuous movement. There has been a need in the art for an improved fold-over belt structure having much longer service life which requires lesser maintenance and downtime due to belt failure or weaknesses requiring costly belt replacement.

U.S. Pat. No. 5,107,983, issued to William H. Tschantz, the inventor of the present invention, which patent is incorporated herein by reference, describes an endless fold-over type of conveyor belt that has a group of closely-spaced longitudinal grooves located on the load-carrying side of the belt. The longitudinal grooved areas are located proximate the edges of the belt and form a hinged area for folding and unfolding the belt. While this belt works fairly well, some problems have been experienced in the conveying of loosely-packed materials such as loose sugar. This type of material tends to become lodged in the grooves and, because of the stickiness of the product, some of the material tends to remain in the grooves after the conveyor has been unloaded. Some of the endless conveyor belts may be of considerable length. Over time the material in the grooves on these long belts may build up to the point that the additional weight on the belt places an unacceptable strain on the motors driving the belt. The material trapped in the grooves may also abrade the belt causing premature wear. Additionally, these belts have been manufactured with the load-carrying side of the belt being made of a softer surface material so that they can be more easily folded at the grooves. When harder load materials, such as coal, are carried on such belts, the hard load material may damage the belt and cause it to delaminate more easily.

Furthermore, since fold-over belts can go up steep angles due to the pressure of the top flaps trapping material against the bottom carrying side of the belt, it is desirable that the belt have a controlled cross section so that the material will not slide back along the belt in steep angles. Therefore, it is desirable to close the top flaps as much as possible to match the cross sectional area of the belt to the material being carried thereby. When the grooves are formed in the load carrying surface the top flaps are held in compression by overhead rollers. This compression may also cause the belt to delaminate prematurely.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

FIG. 1 is a cross-sectional transverse view of the belt showing the multiple grooves at the two similarly hinged areas of the belt;

FIG. 2 is a slightly enlarged cross-sectional view of one portion of the belt shown in FIG. 1 showing one hinged area in greater detail;

FIG. 2A is an enlarged fragmentary sectional view of the improved fold-over belt;

FIG. 3 is a vertical cross-sectional transverse view of the belt in open relation and also showing in a dotted outline, the closed relation of the belt;

FIG. 4 is a vertical cross-sectional transverse view of another embodiment of the belt in closed relation in combination with side rolls;

FIG. 9 is a third embodiment of the belt in which the grooves are box-shaped;

FIG. 10 is a fourth embodiment of the belt in which grooves are formed in both the bottom non-load-carrying surface and the upper load-carrying surface of the belt.

DETAILED DESCRIPTION OF THE INVENTION

Figure 5:
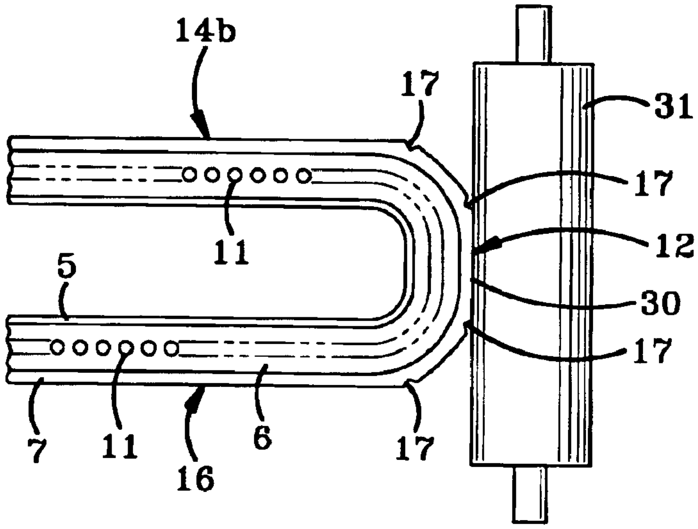
FIG. 5 is an enlarged vertical cross-sectional transverse view of one hinged portion of the belt of FIG. 4 showing the multiple grooves in folded relation closing the belt in one form of load carrying relation and engaged with a side roll.

A typical folding belt conveyor is shown and described in U.S. Pat. No. 4,709,806 entitled "Folding Belt System and Said Belt" issued Dec. 1, 1987, assigned to the Goodyear Tire and Rubber Company. In such a system the continuous endless belt passes over a head-roll or pulley and a tail-roll or pulley, normally called terminals, which are usually located at different elevations. The intermediate area of the belt is supported by a plurality of idler rolls which support the belt in both its open and closed positions. Such system is normally constructed so that three in-line rolls are mounted to cause the belt to form a conventional trough shape in its load carrying arrangement. The rolls may be straight or contoured in such systems which also include tensioning mechanisms to maintain the belt in proper tension to provide for proper driving of the belt in continuous movement for carrying loads such as relatively loose bulk materials without spillage or contamination. Various types of conveyor systems may utilize the fold-over belt of the present invention as set forth hereinbelow.

Referring to the drawings and specifically FIGS. 1, 2 and 2A, a belt, generally indicated by the numeral 10, is preferably formed of three separate layers of a flexible elastomeric material such as rubber. Belt 10 has a top layer 5, an intermediate layer or carcass 6, and a bottom layer 7. In the preferred embodiment, layer 5 will be approximately ⅛ inch thick, intermediate layer 6 will be between 3/16 and ⅝ inch thick and bottom layer 7 will be approximately ⅛ inch thick. Furthermore, belt 10 will have a substantially greater width than thickness as shown in FIG. 1 and will have a generally rectangular cross-sectional configuration. Intermediate layer 6 has longitudinal strengthening cords 11 extending lengthwise throughout. Cords 11 are disposed internally of belt 10 in longitudinal spaced-apart parallel relation. Cords 11 provide increased strength to belt 10 for its tensioning without undue elongation or stretching and to assist in retaining it's rectangular relatively smooth shape. Only a portion of the total number of cords 11 are shown in cross section in FIG. 2.

As shown in FIGS. 1 and 2, belt 10 may have two similarly shaped arrays 12 and 13 of single or multiple grooves 17 in its lower layer 7. Areas or arrays 12, 13 are preferably spaced equidistant from the edges 29 of the belt 10 and generally one-quarter of the width of belt 10, to provide fold-over or flap portions 14, 15 which extend from the central medial portion 16 of belt 10. Grooved areas or arrays 12, 13 preferably have the same number of similarly-shaped grooves 17 to obtain comparable fold-over effects when end flaps 14, 15 are rotated through an angle of about 180° or less. End flaps 14, 15 are capable of swingable folding movement over medial portion 16 after a load is disposed on the central belt portion 33. As shown in FIG. 2, grooved array 12 is shown having four similarly shaped grooves 17 that provide a unitary fold line to distribute inherent stresses over a longer lineal region of the belt width when belt 10 is folded. If multiple grooves 17 are provided, they are preferably spaced an equal distance apart or have a slightly greater spacing in the center portion 18 of belt 10. When belt 10 is folded and unfolded into and out of load carrying relation, grooves 17 more widely distribute the bending moment stresses. Grooves 17 are preferably similarly shaped having either a V-shape or U-shape and they extend into bottom layer 7 to a position closely adjacent intermediate layer 6. Grooves 17 do not extend through layer 7 as this could damage the reinforcement provided by layer 6 as should be evident, any number of grooves may be provided without departing from the spirit of the present invention, although 1–5 grooves 17 in each area are preferred.

The placement of grooves 17 in bottom layer 7 prevents the load material (not shown) from entering and accumulating in the grooves as was the case in the prior art. This in turn prevents a rise in the weight of belt 10 over time from load material accumulating in the grooves. Secondly, having grooves 17 in bottom layer 7 allows flaps 14, 15 to be held in tension by rolls 24,25,26,27. This may reduce the tendency of belt 10 to delaminate. Additionally, bottom layer 7 may be manufactured from a softer material to aid in the folding of the flaps 14, 15. Top layer 5 may be made from a harder, tougher harder material and this may aid in prevent early deterioration of belt 10. The load materials, such as pieces of coal, do not come into contact with the softer bottom layer 7, and consequently the potential for damage to the belt is reduced. All these factors assist in increasing the life expectancy of the belt.

As shown in FIG. 3, belt 10 having longitudinal grooves 17 in paired locations is shown as may be manufactured and employed in use on some types of conveyor systems. End flaps 14, 15 are shown in dotted outline as they are moved vertically upwardly over medial portion 16 of belt 10 into the closed load-carrying relation. Numerals 14*a* and 15*a* show the pair of end flaps in closed relation with their edge portions overlapped to completely enclose the load (not shown).

FIG. 4 shows in yet another embodiment of belt 10 how end flaps 14*b*, 15*b* may be rotated through an angle of about 180° or less over medial portion 16. The plurality of V-shaped grooves 17 at the hinged areas 12, 13 is shown in greater detail in FIG. 5 wherein swingable rotation of end flaps 14*b*, 15*b* of belt 10 opens grooves 17 distributing the inherent stresses and stretching of belt 10 over a much wider lineal region over a wider hinge line.

Another important feature of the improved fold-over belt is that the exterior side or edge 30 of belt 10 is large and flat, allowing for easy engagement by side rolls 31. This feature allows for increased belt control by side rolls 31 and aids in preventing damage to belt 10 especially in horizontal curves. In the prior art, fold-over belts that had rounded sides or edges were prone to damage when engaged by side rolls 31 especially in horizontal curves.

Figure 6:
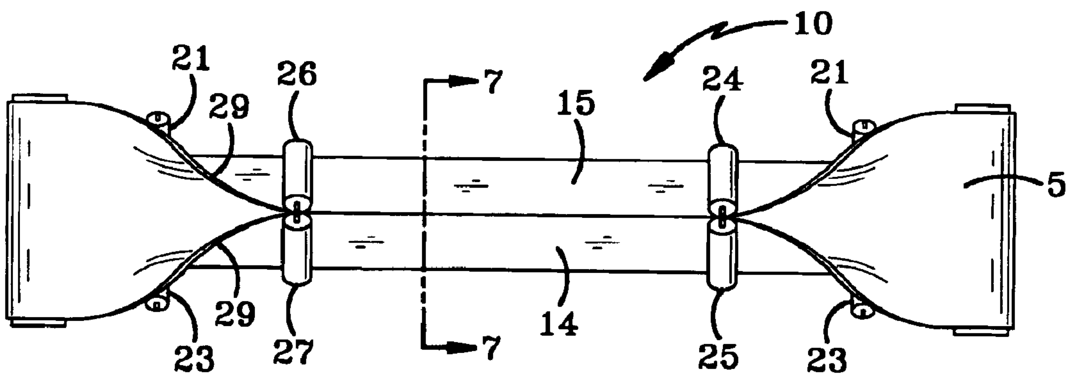
FIG. 6 is a top plan view of the belt showing its open and closed positions between loading and unloading positions in a typical conveyor system.
Figure 7:
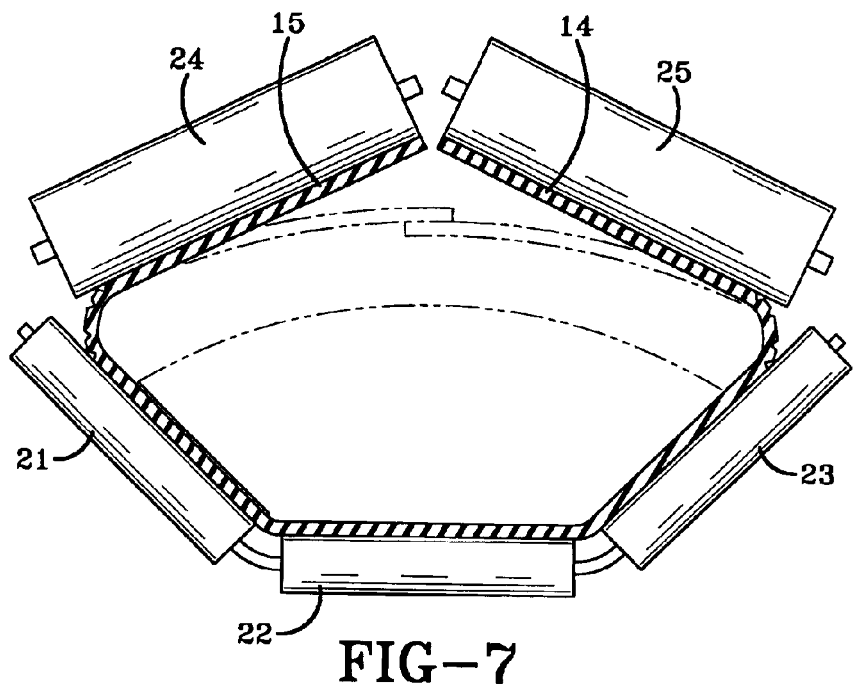
FIG. 7 is a cross-sectional view taken along the line 7—7 of FIG. 6 showing the central portion of the belt having a deeper medial region for greater load carrying capability with the end flaps in closed relation.

Referring to FIGS. 6 & 7 of the drawings, on a typical conveyor apparatus (shown partially in the Figure), endless belt 10 is shown in both open and closed relation. Such opening and closing is effected by contoured rolls 21, 22, 23 located beneath belt 10 and idler rolls 24,25, 26, 27 located over belt 10. Such view is a schematic view shown in simplified form; the various idler rolls 24,25,26, 27 having various contoured configurations to achieve desirable opening and closing of belt 10. As shown in FIG. 6, idler rolls 24, 25 serve to close belt 10 over the load while idler rolls 26, 27 serve to open belt 10 for discharge of the conveyed load. FIG. 7 shows a group of three idler rolls 21, 22 and 23 supporting medial region 16 of belt 10 with idler rolls 24, 25 closing edge flaps 14, 15 over the load retained on belt median portion 16. Edge flaps 14, 15 are preferably overlapped on closing to completely contain the load, although flaps 14, 15 may be either totally closed or slightly spaced-apart depending upon the nature of the bulk materials being conveyed. The longitudinal edges 29 of belt 10 may abut each other or may overlap each other when flaps 14, 15 are folded inwardly. Grooves 17 lie substantially parallel to each other and to longitudinal edges 29 to facilitate this folding. Additional top roller rolls (not shown) may be employed at other areas of belt 10 during its movement to retain belt 10 in the closed position until it is opened for load discharge at the belt-opening position.

Figure 8:
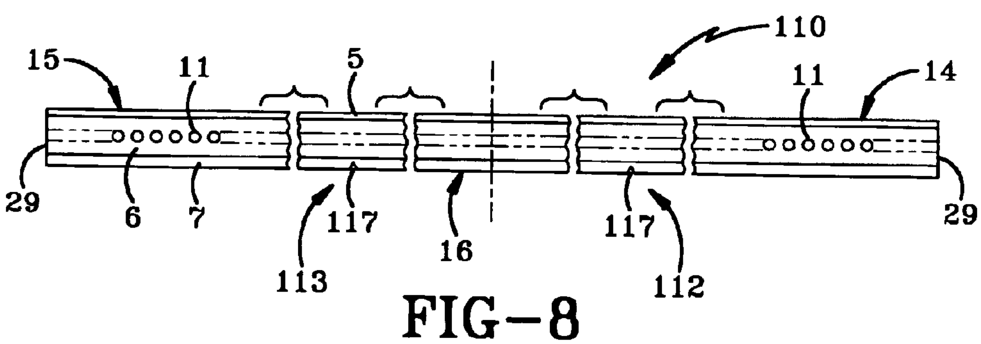
FIG. 8 is a second embodiment of the belt in which the grooved areas each have a single groove in the bottom non-load-carrying surface of the belt.

FIG. 8 shows a second embodiment of the invention wherein belt 110 is again manufactured with three layers, namely, top load-carrying layer 5, intermediate reinforcing layer 6 and bottom, non-load-carrying bottom layer 7. Two similarly shaped areas 112 and 113 are provided, each area having a single groove 117 in bottom layer 7. Areas 112, 113 are preferably spaced equidistant from the edges 29 of belt 110 and generally one-quarter of the width of belt 110, to provide fold-over or flap portions 14, 15 which extend from the central medial portion 16 of belt 110.

FIG. 9 shows a third embodiment of the invention. In this instance, two similarly shaped areas 212 and 213 are provided. Each area 212, 213 has box-shaped grooves 217 formed therein. As with the previous embodiment, each groove 217 has a depth less than the thickness of the lower second layer (not shown). Any other suitably shaped groove may be used without departing from the spirit of the present invention.

FIG. 10 shows a fourth embodiment of the invention. In this instance two similarly shaped areas 312 and 313 are provided. Each area 312, 313 has grooves 317*a* formed in the upper load-carrying layer 5 and grooves 317*b* formed in the bottom non-load-carrying layer 6. Grooves 317*a*, 317*b* may be of any suitable shape and size without departing from the spirit of the invention.

An endless fold-over belt 10 which is particularly useful in this invention is a belt formed of usual rubber compositions such as a sulfur carbon black butadiene styrene or butadiene acrylonitrile rubber. This material is preferably cook-cured at an elevated temperature ranging from about 40° C. to 190° C., preferably about 30 to 40 percent of its cure in the flat unfolded open position with the plural longitudinal grooves 17 being molded into belt 10. In the areas where grooves 17 are formed, end flaps 14, 15 are then laid over to bring the edges 29 into the laid-over position. In this position, end flaps 14, 15 are usually overlapped so that when in use on the conveyor belt 10 is completely closed. The belt is then finally cured in its folded arrangement with end flaps 14, 15 overlying central portion 16. Grooves 17 may be supported with shims (not shown) during such final curing. Further details of manufacture of the belt and testing thereof are set forth in the aforesaid U.S. Pat. No. 4,709,806 wherein the hinged grooves may be molded into the belt during curing. Grooves may also be cut with knives into belt 10 or grooved into belt 10 with abrading wheels.

Accordingly, the improved endless conveyor belt of this invention is simplified and provides an effective, safe, inexpensive and efficient device that eliminates many of the difficulties encountered with prior art devices such as belt breakage.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A flexible endless multifold conveyor belt having a fold-over capability for conveying relatively-loose bulk material loads in an enclosed manner, said belt comprising a body of relatively uniform rectangular cross-section formed of flexible resilient elastomeric material and having a substantially greater width than thickness, the body having an upper load-carrying first surface and a lower non-load-carrying second surface, the second surface having a longitudinal grooved area comprising at least one pair of grooves located generally at about one-quarter the width of the belt from each edge of the belt, thereby defining an outer portion of the belt between each edge and respective grooved area and a medial portion between the two grooved areas, said grooved areas providing a pair of hinged areas for pivoting the outer portions of the belt inwardly upon itself to enclose a load on the medial portion of the first surface when pivoted to a belt-closed position.

2. A flexible endless conveyor belt as defined in claim 1, in which each grooved area includes at least one longitudinally extending first groove.

3. A flexible endless conveyor belt as defined in claim 2, wherein the belt has an intermediate reinforcing layer disposed between the first surface and the second surface.

4. A flexible endless conveyor belt as defined in claim 3, wherein the first groove extends substantially into the second surface.

5. A flexible endless conveyor belt as defined in claim 4, wherein each grooved area further comprises a second longitudinally extending groove and the second groove extends substantially parallel to the first groove and into the first surface.

6. A flexible endless conveyor belt as defined in claim 4, wherein the first and second longitudinal grooves run substantially parallel to the longitudinal edges of the belt.

7. A flexible endless conveyor belt as defined in claim 4, in which each longitudinal grooved area includes between two to five longitudinal grooves.

8. A flexible endless conveyor belt as defined in claim 4, wherein the first longitudinal groove is essentially V-shaped in cross section to provide a comparable bending moment when the outer portions are rotated inwardly about 180° or less on folding to an essentially closed position.

9. A flexible endless conveyor belt as defined in claim 8, wherein each grooved area comprises a unitary hinge line for repeated concurrent folding and unfolding of the outer portion of the belt over and from the load-carrying medial portion of said belt.

10. A flexible endless conveyor belt as defined in claim 4, wherein the outer portions comprise substantially identical equi-length cover flaps.

11. A flexible endless conveyor belt as defined in claim 10, in which each longitudinal grooved area includes four spaced-apart longitudinal grooves.

12. A flexible endless conveyor belt as defined in claim 10, in which each groove in the grooved area is V-shaped and has a depth less than the thickness of the second layer.

13. A flexible endless conveyor belt as defined in claim 10, in which each groove is box-shaped and has a depth less than the thickness of the second layer.

14. A flexible endless fold-over conveyor belt for conveying relatively-loose bulk material in an enclosed manner, said belt comprising a relatively uniform rectangular cross-sectional shape having a substantially greater width than thickness and formed of flexible resilient elastomeric material; said belt being a low-tensioned belt having a top load-carrying side and a bottom non-load-carrying side, said bottom side having two substantially identical arrays of longitudinal grooves comprising at least one pair of grooves located adjacent the longitudinal edges of the belt, the two arrays of longitudinal grooves providing a pair of hinged areas for pivoting the portions of the belt disposed between each longitudinal edge and array of grooves inwardly upon itself to enclose a load on the top side of the belt; the load being carried on a medial portion of the belt disposed between the two grooved arrays.

15. A flexible endless fold-over conveyor belt as defined in claim 14, wherein the two arrays each consist of one longitudinally extending groove.

16. A flexible endless fold-over conveyor belt as defined in claim 14, wherein the two arrays each consist of two to four V-shaped grooves in equi-spaced close arrangement adapted to provide a unitary hinged area.

17. A flexible endless fold-over conveyor belt as defined in claim 14, wherein each of the said two arrays comprise a unitary hinged area for repeated concurrent folding and unfolding of the two outer portions of the belt over and back from the load-carrying medial portion of said belt.

18. A flexible endless fold-over conveyor belt as defined in claim 14, wherein the belt has a reinforced carcass disposed between the top side and the bottom side and the two arrays of longitudinal grooves extend into the bottom side of the belt but terminate prior to the reinforced carcass.

19. A flexible endless fold-over conveyor belt as defined in claim 18, wherein the longitudinal grooves of said two substantially identical spaced-apart arrays each consist of about four substantially identical V-shaped grooves having a uniform depth substantially into the bottom side of the belt but free of contact with the reinforced carcass.

20. A flexible endless fold-over conveyor belt as defined in claim 17, further comprising two substantially identical arrays of second longitudinal grooves located in the top load-carrying side of said belt and adjacent the longitudinal edges of said belt, the two arrays of second longitudinal grooves being disposed opposite the longitudinal grooves in the bottom non-load-carrying side of the belt, whereby the longitudinal grooves and the second longitudinal grooves provide a pair of hinged areas for pivoting the outer portions of said belt inwardly upon itself to enclose a load on the medial portion of the belt between the two sets of grooved arrays.

* * * * *